T. C. BATES.

CORSET.

No. 9,945. Reissued Nov. 22, 1881.

Witnesses

L. F. Connor.

Bernice J. Noyes.

Inventor.

Theodore C. Bates.

by Crosby & Gregory Attys

N. PETERS, Photo-Lithographer, Washington, D. C.

UNITED STATES PATENT OFFICE.

THEODORE C. BATES, OF NORTH BROOKFIELD, MASSACHUSETTS.

CORSET.

SPECIFICATION forming part of Reissued Letters Patent No. 9,945, dated November 22, 1881.

Original No 235,928, dated December 28, 1880. Application for reissue filed September 10, 1881.

*To all whom it may concern:*

Be it known that I, THEODORE C. BATES, of North Brookfield, county of Worcester, State of Massachusetts, have invented an Improvement in Corsets, of which the following description, in connection with the accompanying drawings, is a specification.

This invention relates to corsets, and has for its object the production of an improved corset having its hip sections or portions stiffened by a series of bones or equivalent stiffening-strips extended across an independent series of diagonally placed or curved bones, cords, or other flexible material or stiffening-strips, the vertical series of bones extending preferably from the top to the bottom of the corset. The vertical series of bones or stiffening-strips aid very materially in keeping the diagonal or curved series of bones or stiffening strips in true position, making the hip-section stiffer, and causing it the better to retain the shape given to the lower end of the front of the corset, and enabling the lower end of the front of the corset to be turned or curved inwardly to fit the person.

Figure 1:
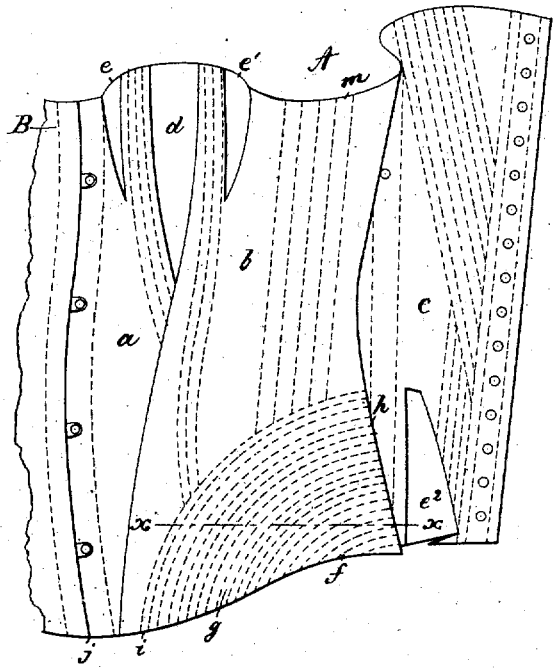
Figure 2:
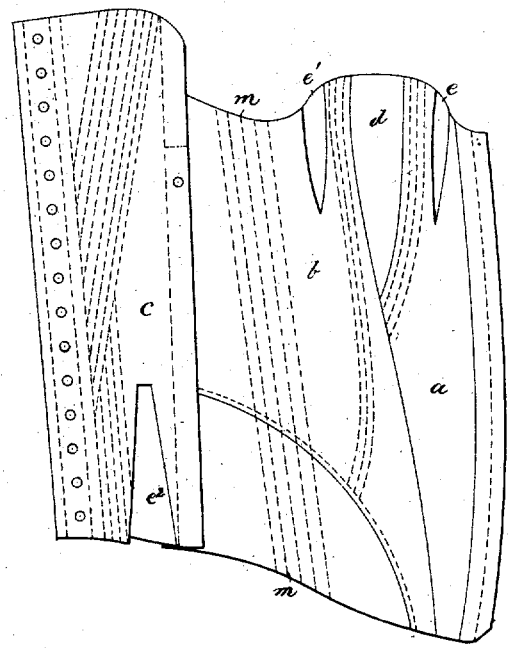
Figure 3:
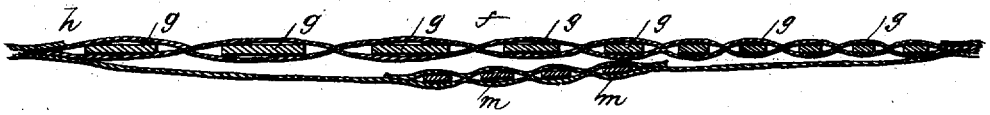

Figure 1 represents, in elevation, the left half and a very little of the right half of a corset; Fig. 2, a like view of the inner side of the left half of the corset; and Fig. 3 is a cross-section, on a larger scale, on line *x x*, Fig. 1, of the vertical stiffeners and the independent diagonal stiffeners.

The half A of the corset is composed of pieces *a b c* and hip-pieces *f* and gores *e e′ e²*, all of cloth and of usual shape.

The hip-section is composed of the usual pieces, and is in this improved corset stiffened in two directions—viz., first, by a series of bones or cords, or other suitable flexible material, *g*, extending from the rear portion or side, *h*, to the bottom of the front of the corset, the said stiffened hip-section going forward over the abdomen to the point *i* at the front of the corset, near the usual steels, *j*, the said series of bones or cords, or other suitable flexible material in the hip portion being curved or slanted upwardly diagonally from the bottom of the corset toward the said side seam, *h*, as indicated by the series of dotted lines, Fig. 1. This stiffened hip portion is shown as yet further stiffened entirely across it to the lower edge of the corset by what I herein denominate the "vertical series" of bones *m*, extending across the series of bones, cords, or flexible material of the hip-section. These vertical bones *m*, either at the front or rear of the bones, cords, or flexible material of the hip portion *f*, keep the bones, cords, or other flexible material of the said hip portion in position, stiffen the lower part of the corset, prevent the corset bending or creasing at the hips, where it usually breaks down, as is the case where the bones are used as in former methods; and the vertical bones also aid in maintaining the inward curve of the lower end of the corset, and generally improve its fit to the person.

I am aware that it is not new to extend a series of bones about the lower part of the corset, the said bones running substantially parallel with the lower edge of the corset; but bones stitched into the corset parallel with the lower edge of the same are liable to crowd upward or override, which is impossible when the ends of the vertical bones are made to terminate at the bottom of the corset.

The letter B represents a portion of the right half of the corset.

I claim—

1. In a corset, the hip-section having in its lower portion bones or stiffening-strips running diagonally from the rear edge of said section downward and forward, and also having vertical bones or stiffening-strips extended across the series of diagonal bones or stiffening-strips, substantially as described.

2. A cloth corset having its side or hip section stiffened in one direction by means of a series of bones, cords, or other flexible material adapted to extend crosswise of the hip, and by means of a second independent series of bones or stiffenings, *m*, crossing the bones, cords, or other flexible stiffening-strips of the other series, to increase the strength of the hip-section, substantially as described.

3. In a corset, the front piece, *a*, and the hip portion or piece *f*, located between the side seam and steel, and stiffened by a series of bones, *g*, or stiffening-strips, combined with the series of bones *m*, made to extend across the bones *g*, for the purpose as shown and described.

THEODORE C. BATES.

Witnesses:
H. H. FAIRBANKS,
BENJ. L. SAMPSON.